United States Patent
Yadav et al.

(10) Patent No.: US 12,536,076 B2
(45) Date of Patent: Jan. 27, 2026

(54) LEVERAGING BACKUP PROCESS METADATA FOR DATA RECOVERY OPTIMIZATION

(71) Applicant: Dell Products L.P., Round Rock, TX (US)

(72) Inventors: Sunil Yadav, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 235 days.

(21) Appl. No.: 17/952,464

(22) Filed: Sep. 26, 2022

(65) Prior Publication Data

US 2024/0103984 A1 Mar. 28, 2024

(51) Int. Cl.
G06F 11/14 (2006.01)

(52) U.S. Cl.
CPC ...... *G06F 11/1469* (2013.01); *G06F 11/1435* (2013.01); *G06F 11/1451* (2013.01)

(58) Field of Classification Search
CPC ............. G06F 11/1469; G06F 11/1435; G06F 11/1451; G06F 11/1453
See application file for complete search history.

(56) References Cited

U.S. PATENT DOCUMENTS

| | | | | |
|---|---|---|---|---|
| 2005/0268341 A1* | 12/2005 | Ross | ............... | H04L 9/3247 726/26 |
| 2007/0094471 A1* | 4/2007 | Shaath | ............... | G06F 12/1466 711/163 |
| 2012/0151255 A1* | 6/2012 | Lee | ............... | G06F 11/1076 714/6.24 |
| 2017/0235754 A1* | 8/2017 | Zhong | ............... | G06F 16/1752 707/649 |
| 2018/0032446 A1 | 2/2018 | Amarendran et al. | | |
| 2020/0125276 A1* | 4/2020 | Shani | ............... | G06F 3/0647 |
| 2020/0301882 A1 | 9/2020 | Pogde et al. | | |
| 2020/0341854 A1* | 10/2020 | Morton | ............... | G06F 16/953 |
| 2021/0133248 A1* | 5/2021 | Sharma | ............... | G06F 11/1435 |
| 2023/0305994 A1* | 9/2023 | Schay | ............... | G06F 11/1435 |

* cited by examiner

*Primary Examiner* — Stephanie Wu
(74) *Attorney, Agent, or Firm* — Chamberlain, Hrdlicka, White, Williams & Aughtry; Aly Z. Dossa (57) ABSTRACT

A method and system for leveraging backup process metadata for data recovery optimization. Concerning file-system data protection, recovery operations tend to be exhaustive processes that often require extensive storage space and network bandwidth, among other, resources. Further, many existing file-system recovery solutions tend to implement whole or full data transfers (i.e., entailing the migration of all file-system data for a sought point-in-time) irrespective of which data may already be maintained on select recovery destinations, thereby unnecessarily allocating and expending said limited resources. In addressing this inefficiency, embodiments disclosed herein use metadata, produced during and/or following backup processes protecting file-system data, to identify and restore portions, rather than the entirety, of file-system data sought to be recovered from backup storage onto any recovery destination(s). Through said mechanism enabling partial file-system data recovery, usage of resources pertinent to the recovery process is optimized.

20 Claims, 4 Drawing Sheets

LEVERAGING BACKUP PROCESS METADATA FOR DATA RECOVERY OPTIMIZATION

BACKGROUND

Concerning file-system data protection, recovery operations tend to be exhaustive processes that often require extensive storage space and network bandwidth, among other, resources. Many existing file-system recovery solutions tend to implement whole or full data transfers irrespective of which data may already be maintained on select recovery destinations, thereby unnecessarily allocating and expending said limited resources.

SUMMARY

In general, in one aspect, the invention relates to a method for information recovery. The method includes seeking recovery of select backup host information; obtaining select backup process metadata corresponding to the select backup host information; extracting a set of backup-having information hashes from the select backup process metadata; identifying a set of destination-lacking information hashes based on the set of backup-having information hashes and a set of destination-having information hashes; and recovering, instead of the select backup host information, a select backup host information subset corresponding to the set of destination-lacking information hashes.

In general, in one aspect, the invention relates to a non-transitory computer readable medium (CRM). The non-transitory CRM includes computer readable program code, which when executed by a computer processor, enables the computer processor to perform a method for information recovery. The method includes seeking recovery of select backup host information; obtaining select backup process metadata corresponding to the select backup host information; extracting a set of backup-having information hashes from the select backup process metadata; identifying a set of destination-lacking information hashes based on the set of backup-having information hashes and a set of destination-having information hashes; and recovering, instead of the select backup host information, a select backup host information subset corresponding to the set of destination-lacking information hashes.

In general, in one aspect, the invention relates to a system. The system includes a destination host device. The destination host device includes a computer processor; and a host protection agent executing on the computer processor and configured to perform a method for information recovery. The method includes seeking recovery of select backup host information; obtaining select backup process metadata corresponding to the select backup host information; extracting a set of backup-having information hashes from the select backup process metadata; identifying a set of destination-lacking information hashes based on the set of backup-having information hashes and a set of destination-having information hashes; and recovering, instead of the select backup host information, a select backup host information subset corresponding to the set of destination-lacking information hashes.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to leveraging backup process metadata for data recovery optimization. Concerning file-system data protection, recovery operations tend to be exhaustive processes that often require extensive storage space and network bandwidth, among other, resources. Further, many existing file-system recovery solutions tend to implement whole or full data transfers (i.e., entailing the migration of all file-system data for a sought point-in-time) irrespective of which data may already be maintained on select recovery destinations, thereby unnecessarily allocating and expending said limited resources. In addressing this inefficiency, embodiments disclosed herein use metadata, produced during and/or following backup processes protecting file-system data, to identify and restore portions, rather than the entirety, of file-system data sought to be recovered from backup storage onto any recovery destination(s). Through said mechanism enabling partial file-system data recovery, usage of resources pertinent to the recovery process is optimized.

Figure 1:
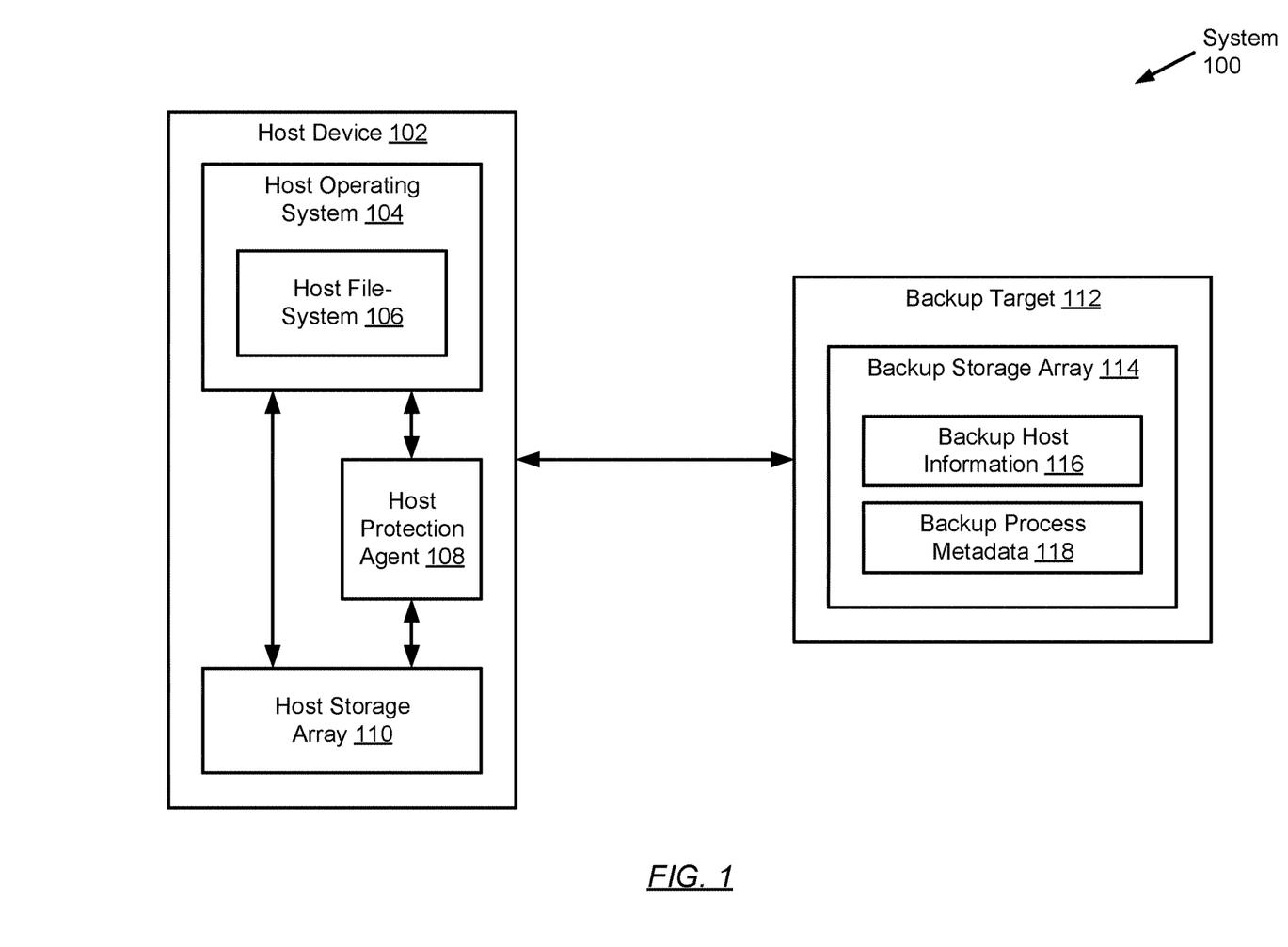
FIG. 1 shows a system in accordance with one or more embodiments of the invention.

FIG. 1 shows a system in accordance with one or more embodiments of the invention. The system (100) may include a host device (102) and a backup target (112). Each of these system (100) components is described below.

In one or many embodiment(s) of the invention, the host device (102) may represent any physical appliance or computing system configured to receive, generate, process, store, and/or transmit data, as well as to provide an environment in which one or many computer program(s) may execute thereon. The computer program(s) may, for example, implement large-scale and complex data processing; or implement one or more services offered locally or over a network (not shown). Further, in providing an execution environment for any computer program(s) installed thereon, the host device (102) may include and allocate various resources (e.g., computer processors, memory, storage, virtualization, network bandwidth, etc.), as needed, to the computer program(s) and/or the tasks (or processes) instantiated thereby. Examples of the host device (102) may include, but may not be limited to, a desktop computer, a laptop computer, a network server, a network mainframe, a smartphone, a tablet computer, or any other computing system similar to the exemplary computing system illustrated and described with respect to FIG. 3, below.

In one or many embodiment(s) of the invention, the host device (102) may include a host operating system (104), a host protection agent (108), and a host storage array (110). Each of these host device (102) subcomponents is described below.

In one or many embodiment(s) of the invention, the host operating system (104) may refer to a computer program that may execute on the underlying hardware of the host device (102), which may be responsible for overseeing host device (102) operations. To that end, and at least in part, the host operating system (104) may include functionality to: support fundamental host device (102) functions; schedule tasks; mediate interactivity between logical (e.g., software) and physical (e.g., hardware) host device (102) components; allocate host device (102) resources; and execute or invoke other computer program(s) executing on the host device (102). Further, one of ordinary skill will appreciate that the host operating system (104) may perform other functionalities without departing from the scope of the invention.

For example, the host operating system (104) may facilitate the access and/or manipulation of host information (described below) by one or many other computer program(s) (e.g., host protection agent (108)) executing on the host device (102). In facilitating the aforementioned access and/or manipulation, the host operating system (104) may implement a host file-system (106). The host file-system (106) may represent a physical file-system (also referred to as a file-system implementation), which may refer to a collection of subroutines concerned with the physical operation of one or many physical storage device(s). The host file-system (106), in this respect, may be concerned with the physical operation of the host storage array (110) (described below). Further, the host file-system (106) may employ host storage array (110) device drivers (or firmware) to process request file operations (e.g., read and/or write operations) from the aforementioned other computer program(s) executing on the host device (102). Device drivers enable the host file-system (106), and thus the host operating system (104), to manipulate physical storage (e.g., host storage array (110)) as appropriate.

In one or many embodiment(s) of the invention, host information may refer to any granularity of data (e.g., a data file, a data directory, etc.), as well as metadata descriptive thereof, that may have been generated, received, manipulated, and/or otherwise maintained on/by the host device (102). Examples of host information may include, but may not be limited to, application data and metadata associated with the computer program(s) (excluding the host operating system (104)) executing on the host device (102), user data and metadata associated with one or many user(s) (not shown) operating the host device (102), and system data and metadata associated with the host operating system (104). Host information is not limited to the aforementioned specific examples. Further, host information may, at least in part, be stored on or across the host storage array (110) (described below).

In one or many embodiment(s) of the invention, the host protection agent (108) may refer to a computer program that may execute on the underlying hardware of the host device (102), which may be responsible for facilitating backup and recovery operations entailing any granularity of host information (described above). To that end, and at least in part, the host protection agent (108) may include functionality to: protect any granularity of host information against loss (i.e., through backup operations); and reconstruct any granularity of host information following said loss (i.e., through recovery operations). Further, one of ordinary skill will appreciate that the host protection agent (108) may perform other functionalities without departing from the scope of the invention.

For example, the host protection agent (108) may leverage backup process metadata (described below) for data recovery optimization. To that end, the host protection agent (108) may perform the method outlined and described with respect to FIG. 2, below.

In one or many embodiment(s) of the invention, the host storage array (110) may refer to a collection of one or more physical storage devices (not shown) on which various forms of digital information—e.g., host information (described above)—may be maintained. Each physical storage device may encompass non-transitory computer readable storage media on which said digital information may be stored in whole or in part, and temporarily or permanently. Further, the host storage array (110) may, at least in part, be implement using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or more embodiment(s) of the invention, the host device (102) may be referred to hereinafter as a source host device and/or a destination host device. As the former, the host device (102) may submit any granularity of host information (described above) to be stored on the backup target (112) through backup operations. As the latter, the host device (102) may receive any granularity of host information to be restored thereon from the backup target (112) through recovery operations.

In one or many embodiment(s) of the invention, the backup target (112) may represent any information backup, archiving, and/or disaster recovery storage system. The backup target (112) may be implemented using one or many storage server(s) (not shown). Each storage server may refer to a physical network server, which may reside in a datacenter, or a virtual network server, which may alternatively reside in a cloud computing environment. Additionally, or alternatively, the backup target (112) may be implemented using one or many computer system(s) similar to the exemplary computing system illustrated and described with respect to FIG. 3, below.

In one or many embodiment(s) of the invention, the backup target (112) may include a backup storage array (114). The backup storage array (114) may refer to a collection of one or more physical storage devices (not shown) on which various forms of digital information—e.g., backup host information (116) and backup process metadata (118) (both described below)—may be maintained. Each physical storage device may encompass non-transitory computer readable storage media on which said digital information may be stored in whole or in part, and temporarily or permanently. Further, the backup storage array (114) may, at least in part, be implement using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) of the invention, backup host information (116) may refer to backup or protected copies of any host information (described above). Backup host information (116) may therefore refer to replicated host information that has been transferred from the host device (102) and stored on the backup target (112) through one or many backup operation(s) (also referred to as backup process(es)). Further, backup host information (116) may encompass full backup copies (i.e., including all data and metadata pertaining to any host information granularity), incremental backup copies (i.e., including only changes to the data and metadata pertaining to any host information granularity since any previously performed backup operation(s)), or a combination thereof.

In one or many embodiment(s) of the invention, backup process metadata (118) may refer to information generated during or following, and descriptive of, any number of backup operations entailing the replication and transfer of any granularity of host information (described above) from the host device (102) to the backup target (112). Further, backup process metadata (118) may be derived, at least in part, from file-system metadata (e.g., host information name, host information size, host information path/location, host information creation timestamp, host information access permissions, host information read/write attributes, host information type, etc.) obtained from the host file-system (106), where said file-system metadata may be associated with said any granularity of host information. Any file-system metadata is/are not limited to the aforementioned specific examples.

In one or many embodiment(s) of the invention, backup process metadata (118) may be organized or indexed into a set of backup process metadata records (not shown), where each backup process metadata record may refer to a data structure (e.g., a table entry or row) configured to retain a backup process metadata (118) portion associated with a given granularity of backup host information (116). Said backup process metadata (118) portion, for any given granularity of backup host information (116), may include, but may not be limited to: (a) an information identifier (ID) assigned to the given granularity of backup host information; (b) an information hash representing a digital signature of the given granularity of backup host information, where the information hash (i.e., message digest) had been obtained by way of a chosen cryptographic hash function applied to the given granularity of backup host information (i.e., message); (c) an information size reflecting a storage space size (e.g., measured in bytes) associated with the given granularity of backup host information; and (d) an information offset indicating a relative location or distance (e.g., measured in bytes) from a starting storage location for the backup host information (116) on the backup storage array (114). Any backup process metadata (118) portions are not limited to the aforementioned specific examples.

In one or many embodiment(s) of the invention, the above-mentioned system (100) components (or subcomponents thereof) may communicate with one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1 shows a configuration of components and/or subcomponents, other system (100) configurations may be used without departing from the scope of the invention. For example, in one or more embodiment(s) of the invention, the system (100) may further include one or more additional host devices (not shown)—each of which may operatively connect to the backup target (112)—and/or one or more additional backup targets (not shown)—each to which the host device (102) may be operatively connected.

Figure 2:
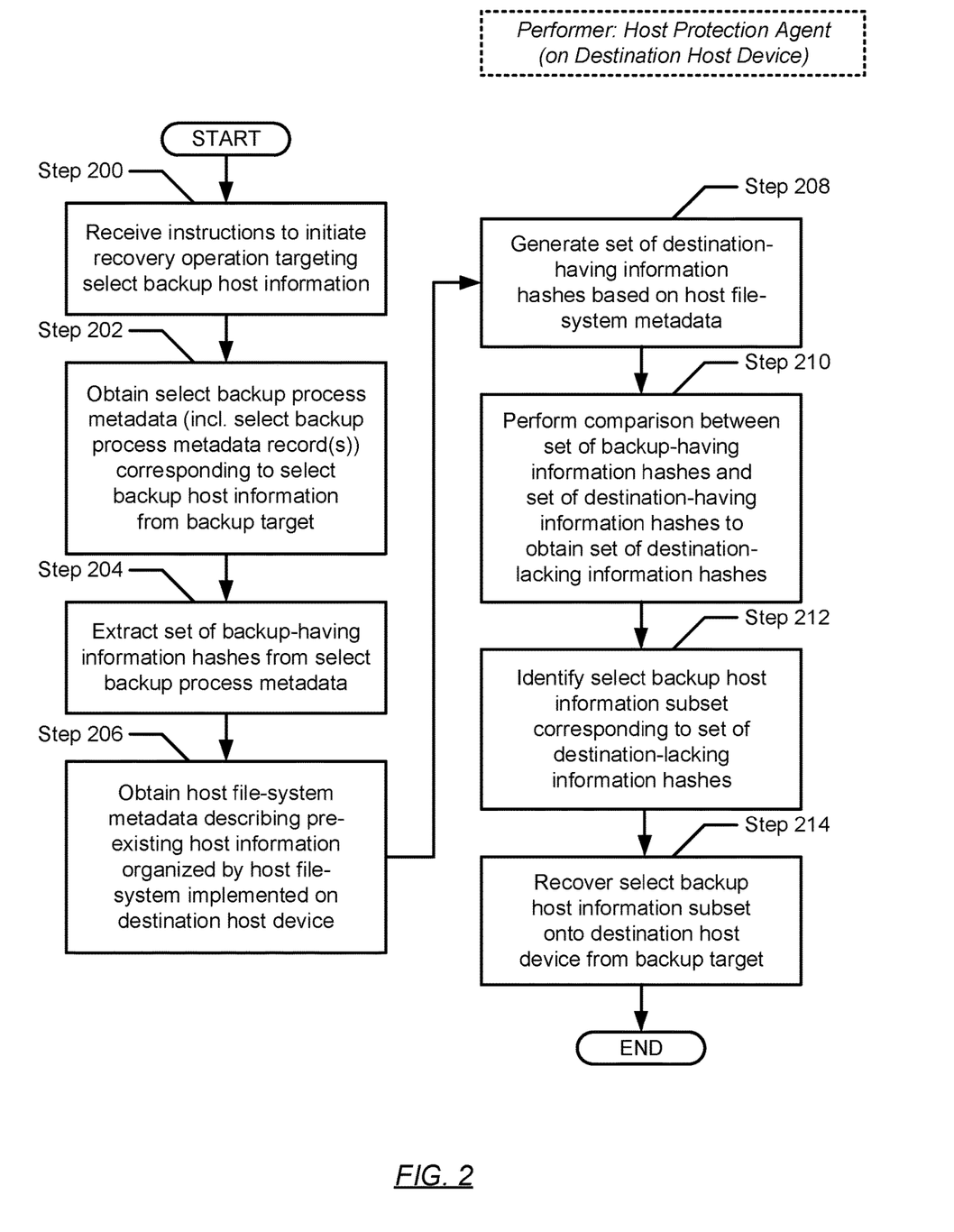
FIG. 2 shows a flowchart describing a method for leveraging backup process metadata for data recovery optimization in accordance with one or more embodiments of the invention.

FIG. 2 shows a flowchart describing a method for leveraging backup process metadata for data recovery optimization in accordance with one or more embodiments of the invention. The various steps outlined below may be performed by a host protection agent operating on any destination host device (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, instructions, directed to initiating a recovery operation, are received. In one or many embodiment(s) of the invention, the recovery operation (or process) may target select backup host information maintained on a backup target (see e.g., FIG. 1). Further, the received instructions may specify one or many information identifier(s)—each of which may uniquely identify a given granularity of select backup host information sought to be recovered.

In Step 202, select backup process metadata is obtained. In one or many embodiment(s) of the invention, the select backup process metadata may include one or many select backup process metadata record(s), where said select backup process metadata record(s) correspond, respectively, to the select backup host information (instructed to be recovered in Step 200). More specifically, each select backup process metadata record may include an information identifier (ID) of the information ID(s) specified in the above-mentioned received instructions.

In Step 204, a set of backup-having information hashes is extracted from the select backup process metadata (obtained in Step 202). In one or many embodiment(s) of the invention, the set of backup-having information hashes may include one or many information hash(es) specified in, and thus corresponding respectively to, the select backup process metadata record(s) forming the select backup process metadata. The information hash, for any given granularity of the select backup host information, may refer to a digital signature or a (fixed size) numeric representation of the contents of the (arbitrary size) given granularity of the select backup host information.

In Step 206, host file-system metadata is obtained. In one or more embodiment(s) of the invention, the host file-system metadata may describe any granularity of pre-existing host information already maintained on the destination host device. Further, a host file-system, implemented by a host operating system of the destination host device, may serve to organize or index at least the pre-existing host information. In this respect, the host file-system metadata may be created and managed by, and therefore obtained from, the host file-system.

Moreover, for any given granularity of pre-existing host information (e.g., a data file, a data directory, etc.) already maintained on the destination host device, examples of the associated host file-system metadata may include, but may not be limited to: a host information name titling the given granularity of pre-existing host information; a host information size indicating an amount of storage space (e.g., measured in bytes) consumed by the given granularity of pre-existing host information; a host information path specifying a location, within the host file-system, of the given granularity of pre-existing host information; a host information creation timestamp reflecting an encoded date and/or time at which the given granularity of pre-existing host information had been created (or first introduced) on the destination host device; a set of host information access permissions indicating the user(s) permitted to interact with the given granularity of pre-existing host information; a set of host information read/write attributes specifying file operation permissions for interacting with the given granularity of pre-existing host information; and a host information type reflecting a format through which the given granularity of pre-existing host information may be encoded for storage. Host file-system metadata is/are not limited to the aforementioned specific examples.

In Step 208, a set of destination-having information hashes is generated based on the host file-system metadata (obtained in Step 206). In one or more embodiment(s) of the invention, the set of destination-having information hashes may include one or many information hash(es) that correspond, respectively, to the one or many granularity (granularities) of pre-existing host information already maintained on the destination host device. The information hash, for any given granularity of host information already maintained on the destination host device, may refer to a digital signature or a (fixed size) numeric representation of the contents of the (arbitrary size) given granularity of host information and, further, may be derived through the application of any existing cryptographic hash function/algorithm to or onto a pre-defined subset (or all) of the host file-system metadata respective to the given granularity of host information.

Moreover, any information hash in the set of destination-having information hashes may be generated using the same existing cryptographic hash function/algorithm, as well as the same subset (or all) of the host file-system metadata, used to generate any information hash in the above-mentioned set of backup-having information hashes. Generation of the backup-having information hash(es) may transpire, or may have transpired, during or following any backup operation(s) or process(es) instantiated on a source host device, where said backup operation(s)/process(es) may target, or may have targeted, any one or more granularities of host information thereon sought to be protected.

In Step 210, a comparison is performed between the set of backup-having information hashes (extracted in Step 204) and the set of destination-having information hashes (generated in Step 208). In one or many embodiment(s) of the invention, the comparison may result in obtaining a set of destination-lacking information hashes, where the set of destination-lacking information hashes may represent a set difference of information hashes. In this respect, the set of destination-lacking information hashes may include zero or more information hashes that is/are included in the set of backup-having information hashes yet is/are not included in the set of destination-having information hashes.

In Step 212, a select backup host information subset is identified. In one or many embodiment(s) of the invention, the select backup host information subset may correspond, respectively, to the set of destination-lacking hashes (obtained in Step 210). Specifically, the set of destination-lacking hashes may be used to identify zero or more select backup process metadata records (obtained in Step 202), where each backup process metadata record (if any) specifies an information hash of the information hash(es) forming the set of destination-lacking hashes (i.e., if a cardinality thereof exceeds zero). In turn, the identified zero or more select backup process metadata records may subsequently be used to respectively identify zero or more granularities of backup host information representing a subset, or none, of the select backup host information (initially sought for recovery in Step 200).

Accordingly, in one or many embodiment(s) of the invention, the select backup host information subset may include at least one granularity of the select backup host information (which had been initially sought for recovery in Step 200)—should at least one select backup process metadata record (obtained in Step 202) be identified that corresponds, respectively, to the at least one information hash forming the set of destination-lacking hashes. Further, in said one or many embodiment(s), the set of destination-lacking hashes, including at least one information hash, may indicate that the destination host device does not already maintain pre-existing host information thereon matching the at least one granularity of select backup host information.

Alternatively, in one or many other embodiment(s) of the invention, the select backup host information subset may include zero or none of the granularities of the select backup host information (which had been initially sought for recovery in Step 200)—should zero or none of the select backup process metadata record(s) (obtained in Step 202) be identified that corresponds, respectively, to an empty set of information hashes reflecting the (empty) set of destination-lacking hashes. Further, in said one or many other embodiment(s), the set of destination-lacking hashes, being an empty set of information hashes, may indicate that the destination host device already maintains pre-existing host information thereon matching all the select backup host information.

In Step 214, the select backup host information subset (identified in Step 212) is recovered onto the destination host device. In one or many embodiment(s) of the invention, said recovery may entail the transfer of any granularities of backup host information, forming the select backup host information subset, from the backup target to the destination host device. In one or many other embodiment(s) of the invention, should the select backup host information subset include none of the granularities of the select backup host information (which had been initially sought for recovery in Step 200), then the transfer of any backup host information from the backup target to the destination host device may not transpire.

In one or many embodiment(s) of the invention, recovering the select backup host information subset (if any) (identified in Step 212), rather than recovering the select backup host information (initially sought to be recovered in Step 200) in entirety, optimizes the allocation and consumption of resources pertinent to any file-system recovery processes. Said optimization, more specifically, targets the storage space and network bandwidth requirements for conducting file-system recoveries. That is, with the recovery of the select backup host information subset, (a) less information migrates across a network from a backup target to a destination host device, thereby reducing the network bandwidth needed to support said migration; and (b) less information translates to less information size, thereby reducing the storage space on the destination host device needed to retain the recovered information.

Figure 3:
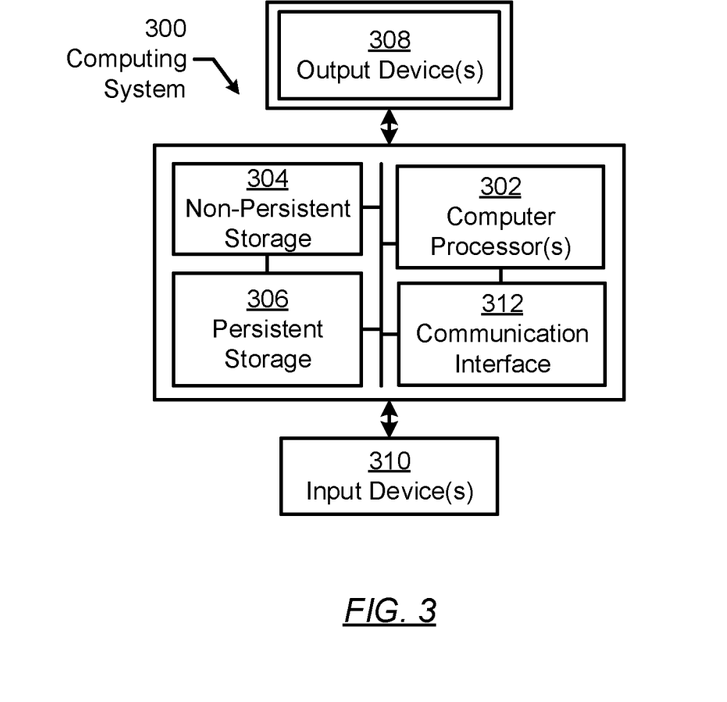
FIG. 3 shows an exemplary computing system in accordance with one or more embodiments of the invention.

FIG. 3 shows an exemplary computing system in accordance with one or more embodiments of the invention. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one or many embodiment(s) of the invention, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one or many embodiment(s) of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 4:
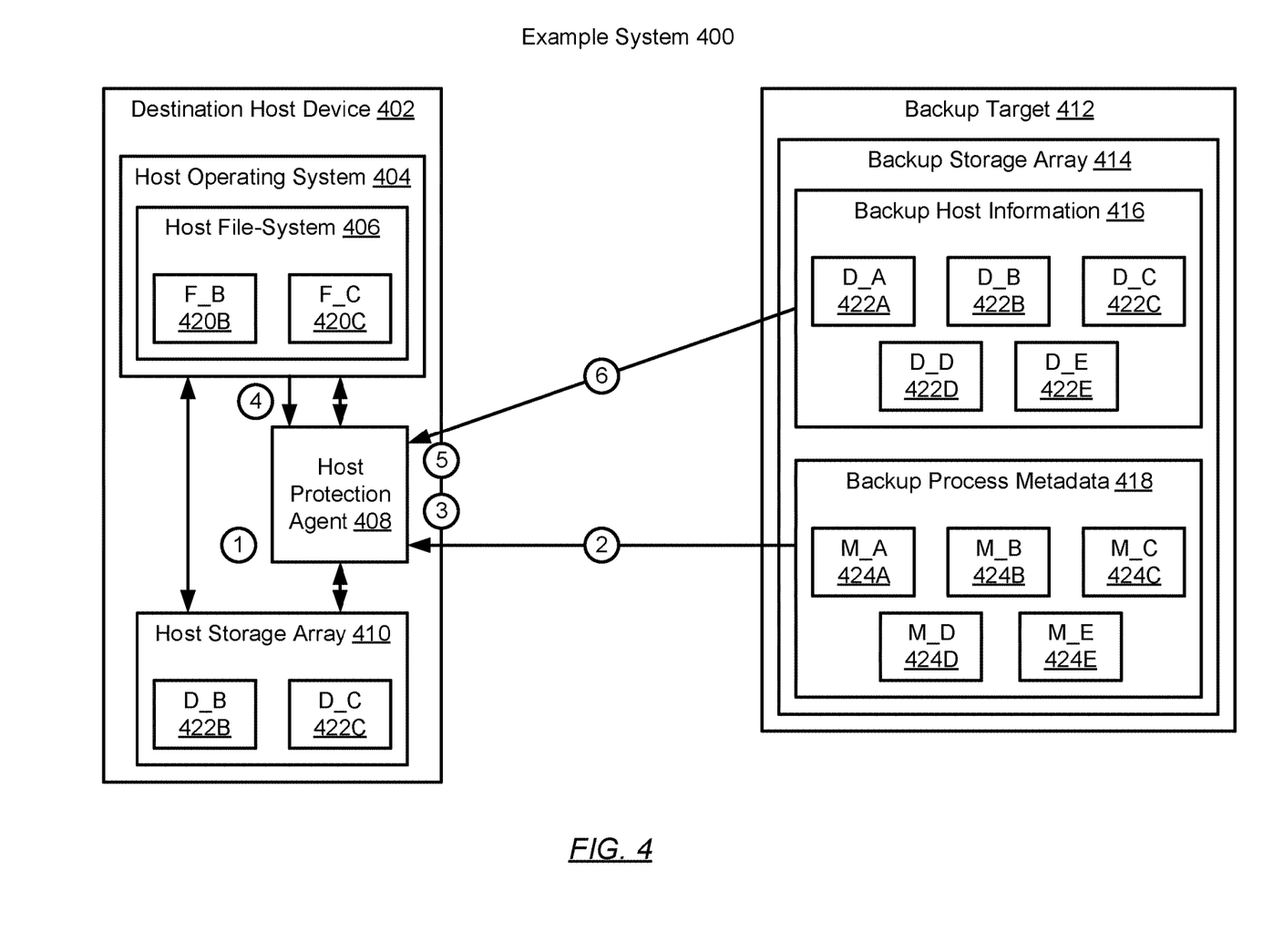
FIG. 4 shows an exemplary scenario in accordance with one or more embodiments of the invention.

FIG. 4 shows an exemplary scenario in accordance with one or more embodiments of the invention. The exemplary scenario, illustrated through FIG. 4 and described below, is for explanatory purposes only and not intended to limit the scope of the invention.

Turning to FIG. 4, an example system (400), including a destination host device (402) operatively connected to a backup target (412), is portrayed.

The destination host device (402) includes a host operating system (404), a host protection agent (408), and a host storage array (410)—where the host operating system (404) implements a host file-system (406). Further, the host storage array (410) maintains data block sets (422B, 422C), whereas the host file-system (406) maintains hierarchically-organized data files (420B, 420C), representative of pre-existing host information already residing on the destination host device (402).

The backup target (412), meanwhile, includes a backup storage array (414). The backup storage array (414), in turn, stores backup host information (416) and backup process metadata (418). The backup host information (416) includes backup copies of five data block sets (422A-422E), while the backup process metadata (418) includes five backup process metadata records (424A-424E) respective to the backup host information (416).

In view of the above, consider a scenario where the host protection agent (408) is instructed to seek recovery of select backup host information (422A, 422B, 422D) from the backup target (412). To that end, the following series of steps (described herewith in conjunction with the numbered bubbles shown in FIG. 4) may be performed:

(1) Host protection agent (408) receives instructions directed to initiating a recovery operation targeting select backup host information (422A, 422B, 422D)

(2) Host protection agent (408) obtains select backup process metadata records (424A, 424B, 424D) from backup process metadata (418); select backup process metadata records (424A, 424B, 424D) correspond to select backup host information (422A, 422B, 422D)

(3) Host protection agent (408) extracts set of backup-having information hashes (not shown) (e.g., IH_A, IH_B, IH_D) from select backup process metadata records (424A, 424B, 424D)

(4) Host protection agent (408) obtains host file-system metadata (not shown) (e.g., HFM_B, HFM_C) for pre-existing host information (422B, 422C) residing on destination host device (402) from host file-system (406)

(5) Host protection agent (408) generates set of destination-having information hashes (not shown) (e.g., IH_B, IH_C) based on host file-system metadata (e.g., HFM_B, HFM_C); then identifies set of destination-lacking information hashes (not shown) (e.g., IH_A, IH_D) representing set difference between set of backup-having information hashes (e.g., IH_A, IH_B, IH_D) and set of destination-having information hashes (e.g., IH_B, IH_C)

(6) Host protection agent (408) recovers select backup host information subset (422A, 422D) from backup target (412); select backup host information subset (422A, 422D) corresponds to set of destination-lacking information hashes (e.g., IH_A, IH_D)

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for information recovery, the method comprising:
    seeking recovery to a host device of select backup host information stored on a backup target;
    obtaining select backup process metadata corresponding to the select backup host information, wherein the select backup process metadata corresponding to the select backup host information includes:
        a host information name titling a given granularity of the select backup host information;
        a host information size indicating an amount of storage space used by the given granularity of the select backup host information;
        a host information path specifying a location of the given granularity of the select backup host information;
        a host information creation timestamp reflecting an encoded date and time at which the given granularity of the select backup host information was created;
        a set of host information access permissions indicating users permitted to interact with the given granularity of the select backup host information;
        a set of host information read/write attributes specifying file operation permissions for interacting with the given granularity of the select backup host information; and
        a host information type reflecting a format through which the given granularity of the select backup host information may be encoded for storage;
    extracting a set of backup-having information hashes from the select backup process metadata;
    identifying a set of destination-lacking information hashes based on the set of backup-having information hashes and a set of destination-having information hashes corresponding to host file-system metadata;
    identifying a subset of the select backup host information corresponding to the set of destination-lacking information hashes;
    recovering, instead of the select backup host information, the subset from the backup target to the host device; and
    reconstructing the select backup host information using the recovered subset.

2. The method of claim 1, wherein identifying the set of destination-lacking information hashes, comprises:
    identifying a set difference between the set of backup-having information hashes and the set of destination-having information hashes,
    wherein the set difference comprises at least one information hash, and
    wherein each information hash of the at least one information hash is specified in the set of backup-having information hashes and is not specified in the set of destination-having information hashes.

3. The method of claim 1, wherein the set of backup-having information hashes comprises at least one information hash, and wherein the at least one information hash corresponds, respectively, to at least one select backup process metadata record of the select backup process metadata.

4. The method of claim 1, the method further comprising:
    prior to identifying the set of destination-lacking information hashes:
        obtaining the host file-system metadata describing pre-existing host information residing on a destination host device; and
        generating the set of destination-having information hashes based on the host file- system metadata.

5. The method of claim 4, wherein the host file-system metadata is obtained from a host file-system implemented on the destination host device, and wherein the select backup process metadata is obtained from storage on a backup target.

6. The method of claim 4, wherein the set of destination-having information hashes comprises at least one information hash, and wherein the at least one information hash corresponds, respectively, to at least one granularity of the pre-existing host information.

7. The method of claim 6, wherein each granularity in the at least one granularity of the pre-existing host information is one selected from a group comprising a data file and a data directory.

8. The method of claim 1, the method further comprising:
    seeking recovery of second select backup host information;
    obtaining second select backup process metadata corresponding to the second select backup host information;
    extracting a second set of backup-having information hashes from the second select backup process metadata;
    identifying a second set of destination-lacking information hashes based on the second set of backup-having information hashes and a second set of destination-having information hashes; and
    recovering, instead of the second select backup host information and based on the second set of destination-lacking information hashes, none of the second select backup host information.

9. The method of claim 8, wherein identifying the set of destination-lacking information hashes, comprises:
    identifying a set difference between the set of backup-having information hashes and the set of destination-having information hashes,
    wherein the set difference comprises zero information hashes.

10. A non-transitory computer readable medium (CRM) comprising computer readable program code, which when executed by a computer processor, enables the computer processor to perform a method for information recovery, the method comprising:
    seeking recovery to a host device of select backup host information stored on a backup target;
    obtaining select backup process metadata corresponding to the select backup host information, wherein the select backup process metadata corresponding to the select backup host information includes:
        a host information name titling a given granularity of the select backup host information;
        a host information size indicating an amount of storage space used by the given granularity of the select backup host information;

a host information path specifying a location of the given granularity of the select backup host information;

a host information creation timestamp reflecting an encoded date and time at which the given granularity of the select backup host information was created;

a set of host information access permissions indicating users permitted to interact with the given granularity of the select backup host information;

a set of host information read/write attributes specifying file operation permissions for interacting with the given granularity of the select backup host information; and a host information type reflecting a format through which the given granularity of the select backup host information may be encoded for storage;

extracting a set of backup-having information hashes from the select backup process metadata;

identifying a set of destination-lacking information hashes based on the set of backup-having information hashes and a set of destination-having information hashes corresponding to host file-system metadata;

identifying a subset of the select backup host information corresponding to the set of destination-lacking information hashes;

recovering, instead of the select backup host information, the subset from the backup target to the host device; and reconstructing the select backup host information using the recovered subset.

11. The non-transitory CRM of claim 10, wherein identifying the set of destination-lacking information hashes, comprises:

identifying a set difference between the set of backup-having information hashes and the set of destination-having information hashes, wherein the set difference comprises at least one information hash, and wherein each information hash of the at least one information hash is specified in the set of backup-having information hashes and is not specified in the set of destination-having information hashes.

12. The non-transitory CRM of claim 10, wherein the set of backup-having information hashes comprises at least one information hash, and wherein the at least one information hash corresponds, respectively, to at least one select backup process metadata record of the select backup process metadata.

13. The non-transitory CRM of claim 10, the method further comprising:

prior to identifying the set of destination-lacking information hashes:

obtaining the host file-system metadata describing pre-existing host information residing on a destination host device; and generating the set of destination-having information hashes based on the host file-system metadata.

14. The non-transitory CRM of claim 13, wherein the host file-system metadata is obtained from a host file-system implemented on the destination host device, and wherein the select backup process metadata is obtained from storage on a backup target.

15. The non-transitory of claim 13, wherein the set of destination-having information hashes comprises at least one information hash, and wherein the at least one information hash corresponds, respectively, to at least one granularity of the pre-existing host information.

16. The non-transitory CRM of claim 15, wherein each granularity in the at least one granularity of the pre-existing host information is one selected from a group comprising a data file and a data directory.

17. The non-transitory CRM of claim 10, the method further comprising:

seeking recovery of second select backup host information;

obtaining second select backup process metadata corresponding to the second select backup host information;

extracting a second set of backup-having information hashes from the second select backup process metadata;

identifying a second set of destination-lacking information hashes based on the second set of backup-having information hashes and a second set of destination-having information hashes; and recovering, instead of the second select backup host information and based on the second set of destination-lacking information hashes, none of the second select backup host information.

18. The non-transitory of claim 17, wherein identifying the set of destination-lacking information hashes, comprises:

identifying a set difference between the set of backup-having information hashes and the set of destination-having information hashes, wherein the set difference comprises zero information hashes.

19. A system, the system comprising:

a destination host device, comprising:

a computer processor; and a host protection agent executing on the computer processor and configured to perform a method for information recovery, the method comprising:

seeking recovery to a host device of select backup host information stored on a backup target;

obtaining select backup process metadata corresponding to the select backup host information, wherein the select backup process metadata corresponding to the select backup host information includes:

a host information name titling a given granularity of the select backup host information;

a host information size indicating an amount of storage space used by the given granularity of the select backup host information;

a host information path specifying a location of the given granularity of the select backup host information;

a host information creation timestamp reflecting an encoded date and time at which the given granularity of the select backup host information was created;

a set of host information access permissions indicating users permitted to interact with the given granularity of the select backup host information;

a set of host information read/write attributes specifying file operation permissions for interacting with the given granularity of the select backup host information; and a host information type reflecting a format through which the given granularity of the select backup host information may be encoded for storage;

extracting a set of backup-having information hashes from the select backup process metadata;

identifying a set of destination-lacking information hashes based on the set of backup-having information hashes and a set of destination-having information hashes corresponding to host file-system metadata;

identifying a subset of the select backup host information corresponding to the set of destination-lacking information hashes;

recovering, instead of the select backup host information, the subset from the backup target to the host device; and reconstructing the select backup host information using the recovered subset.

20. The system of claim 19, the system further comprising:

a backup target operatively connected to the destination host device, and comprising:

backup host information comprising the select backup host information; and the backup process metadata.

\* \* \* \* \*